Aug. 9, 1960  L. A. KEIM  2,948,645
METHOD FOR PRESSING LAMINATED GLASS
Filed Aug. 19, 1955

INVENTOR.
LAURENCE A. KEIM
BY Oscar Spencer
ATTORNEY

United States Patent Office 2,948,645
Patented Aug. 9, 1960

2,948,645

METHOD FOR PRESSING LAMINATED GLASS

Laurence A. Keim, Mount Lebanon, Pa., assignor to Pittsburgh Plate Glass Company, a corporation of Pennsylvania Filed Aug. 19, 1955, Ser. No. 529,404

14 Claims. (Cl. 154—2.7)

This invention relates to a method for the pressing of a curved laminated glass assembly comprising two matched sheets of curved glass and a thermoplastic interlayer so that substantially throughout the entire area of the assembly the interlayer is bonded to the two glass sheets.

Curved laminated glass assemblies have been developed for various uses especially as curved windshields for automobiles. Initially the curved windshields had a longitudinal curvature that was relatively constant from one end to the other. Then curved laminated glass windshields were developed in which the portions of the end sections of the windshield adjacent the central section had a substantially smaller radius of curvature than any of the other portions. Further development resulted in curved laminated glass windshields in which the end sections of these wrap-around windshields were twisted or bent about the longitudinal axis. Other developments included the provision in the laminated glass assemblies of a transverse curvature as well as the longitudinal curvature with or without the end sections being twisted about the longitudinal axis. Thus, various designs of wrap-around windshields, some of which are known as compound windshields because of the transverse curvature, have been developed.

Initially laminated glass assemblies were flat and were treated to bond the plastic interlayer to the opposing surfaces of the glass sheets by passing the assembly after heating through a pair of resilient nipper rolls. With the development of curved laminated glass assemblies, it was at first necessary to place the assembly within an oil-resistant plastic bag and then the bag was sealed and followed by evacuation of the bag for removal of the air from between the thermoplastic interlayer and the glass sheets. The sealed evacuated bag with its contents was placed in an oil which was then heated to an elevated temperature and subjected to an elevated pressure. It should be mentioned that when the flat glass laminated assemblies were treated for sealing of the marginal edge by heating and passing through the pair of nipper rolls, the resulting pressed product which was known as a prepressed laminated assembly was placed in direct contact with the oil and subjected to said elevated temperature and pressure.

With the development of the more complex type of laminated glass assemblies developed for windshields, as described above, modifications of the apparatus utilizing yieldable nipper rolls became necessary. However, the yield of satisfactory prepressing of these windshields was low and the degree of breakage in this prepressing was high. Similarly, the use of the plastic bag evacuation method for protecting the laminating assembly from penetration of oil during lamination or final pressing was not satisfactory. During the evacuation in the plastic bag the glass sheets were pulled against the plastic interlayer when the air was removed and defects in matching of the two sheets of glass would result in breakage. Furthermore, the handling of these plastic bags with the large laminated glass assemblies therein would result in some breakage. In both cases, the breakage would not be detectable until the bag and its contents had been subjected to the autoclave or final pressing treatment in the oil and the contents then removed from the bag. This meant the autoclave equipment was being used for lamination of assemblies already broken thus preventing the maximum utilization of the autoclave equipment.

This invention is particularly directed to an overall method including preliminary pressing and a subsequent autoclaving step to completely bond the laminations of the curved glass assembly. One of the major objects of this invention is to simplify the apparatus used in preliminary pressing and also to simplify and improve the procedure followed in such preliminary pressing, so as to obtain a greater yield of prepressed assemblies which are in proper condition for the final autoclaving steps, thereby improving the efficiency of the overall method.

It is an object of the present invention to provide a method for the preliminary pressing of a curved laminated glass assembly which can be visually examined for breakage followed by placing it in an autoclave for final pressing by usual treatment of an assembly at an elevated temperature to an elevated fluid pressure.

Other objects of the present invention will be apparent to one skilled in the art from the description which follows when taken in conjunction with the drawings wherein similar components are designated by the same numeral and in which.

Figure 3:
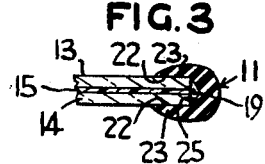
Figure 4:
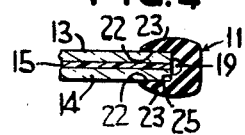

Fig. 3 is a fragmentary cross section of a laminated glass assembly enclosed in the marginal area by an alternate form of the channel-shaped continuous member used in the prepressing steps of the method of the present invention; and Fig. 4 is a fragmentary cross section of another embodiment of the channel-shaped member used in the prepressing steps of the method of the present invention enclosing a marginal area of a laminated glass assembly.

Figure 1:
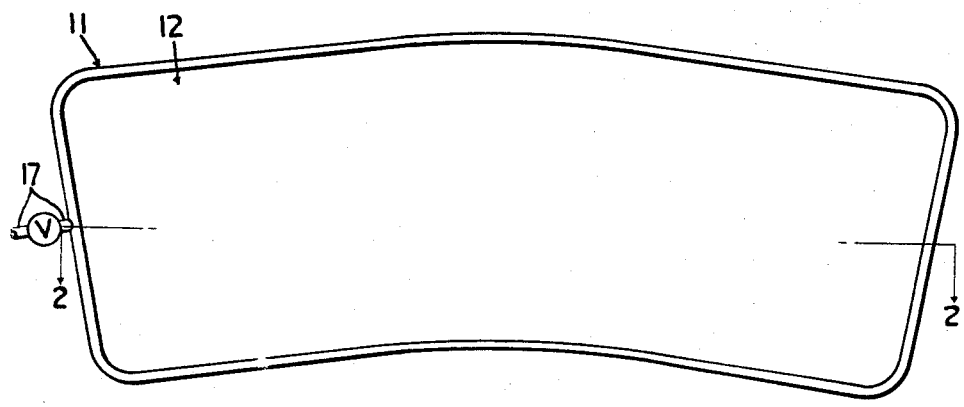
Fig. 1 is a top plan view of apparatus used in the method of the present invention for prepressing at least a marginal area of a laminated glass assembly and shows the curved laminated glass assembly mounted within the apparatus.
Figure 2:
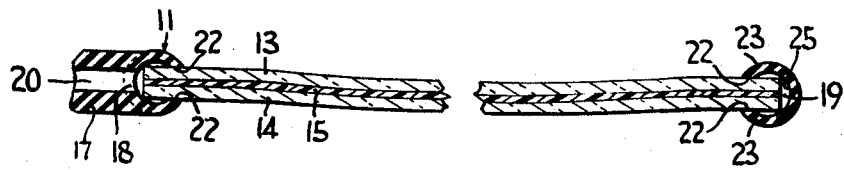
Fig. 2 is a cross section of Fig. 1 taken along line 2—2.

In the apparatus used in the method of this invention there is provided for use in carrying out the prepressing steps a continuous or an endless channel-shaped flexible member generally indicated at 11 that surrounds laminated glass assembly generally indicated at 12. It is seen from Figs. 2, 3 and 4 that channel-shaped member 11 is essentially tubular. As a matter of fact, in the initial development of the method a piece of tubing was split longitudinally and the ends were joined to form continuous channel-shaped member 11. As seen in Fig. 2, laminated glass assembly 11 comprises curved glass sheets 13 and 14 having a thermoplastic interlayer 15 therebetween. Connected to member 11 is tube 17 which is in alignment with a hole 18 provided in the outermost wall of member 11 so as to provide communication between the channel 19 of member 11 and conduit 20 of tube 17. The inner surfaces 22 of side flanges 23 of channel-shaped member 11 abut a marginal area of laminated glass assembly 12 and provide at least some degree of sealing engagement with at least part of the marginal area completely around the outer surfaces of laminated glass assembly 12. In the apparatus shown in Fig. 1, a valve V is in tube 17 connected to a vacuum source (not shown). Valve V can be closed after evacuation of channel 19. It is seen in Figs. 2, 3 and 4 that the web portion 25 of channel-shaped member 11 is provided on its inner surface with a longitudinally disposed concave portion to ensure the presence of channel 19 between the periphery of assembly 12 and member 11. Figs. 2, 3 and 4 show various modifications of this type of cavity as well as various types of side walls or flanges for engagement with a marginal area of assembly 12.

In the method of the present invention the assembly, comprising two sheets of glass of matched curvature and a thermoplastic interlayer therebetween, for the prepressing steps is enclosed within a fluid-impervious material, such as the endless, channel-shaped member 11, that is in engagement with the outer surfaces of a marginal portion only and is spaced from the periphery of the interlayer to provide a conduit therearound. The conduit is then evacuated utilizing a vacuum, such as at least 10 inches of mercury and preferably at least 25 inches of mercury, to remove air from between the interlayer and the glass sheets. The vacuum is thus provided substantially only at the periphery of the assembly, i.e., the vacuum is provided either at the periphery alone of the assembly or at the periphery and the margin only of the major outer surfaces of the assembly. While at least part of the vacuum is maintained in the conduit, the entire assembly and the fluid-impervious material therearound is heated to an elevated temperature, such as about 150 to 350° F. and preferably about 225 to 300° F., for a sufficient length of time to seal or bond at least a narrow marginal area of the glass assembly. In this manner the assembly is prepressed, that is, the edges are sealed so that the assembly is prepared for the final steps of the present method, wherein the assembly at an elevated temperature is pressed by subjecting the assembly including the periphery of the interfaces between the interlayer and the glass sheets directly to an elevated fluid pressure substantially above atmospheric pressure, such as in an autoclave, so as to complete the bond between interlayer and glass sheets substantially throughout the entire assembly. Prepressing thus seals the edges to prevent autoclave fluid from penetrating between the laminations of the assembly.

In one embodiment of the invention, in prepressing the assembly evacuation can be continued during the step of heating, which is carried out while the assembly with the channel-shaped member therearound is surrounded by air or other gas at substantially atmospheric pressure, to seal at least a marginal area. When the fluid-impervious material is not in a complete sealing engagement with the outer surfaces of the marginal portion of the assembly, the gas will leak to some extent into the conduit; thus, it has been found most desirable to continue the evacuation during the heating. In this embodiment, after sealing the marginal area by the steps of evacuation through the continuous channel-shaped member, and heating at substantially atmospheric pressure, the laminated glass assembly at an elevated temperature is subjected without the channel-shaped member therearound to direct contact with a fluid, e.g., oil or air for the application of an elevated pressure to complete the pressing or sealing of the assembly. The channel-shaped member is removed before the heat and pressure treatment and portions of the assembly are edge rolled before the treatment in the fluid.

*Example I*

A number of curved windshields, having the compound curvature described above, were prepressed as described above prior to pressing in an autoclave. The channel-shaped member 11 was the type shown in Fig. 2. The amount of vacuum applied was about 29 inches of mercury. In these tests the vacuum was applied and the evacuation was continued while the assembly was in an oven maintained at 250° F. for one hour. These compound windshields had a satisfactory sealing of the marginal area. Only a few inches, about 10 inches, of the periphery required a treatment known as edge rolling. This treatment is customarily applied to the laminated glass assemblies that have been prepressed by passage while hot through a pair of yieldable nipper rolls. The treatment comprises utilizing a tool having a roller that is about the thickness of the plastic interlayer and this roller is rolled between the two sheets of glass at the periphery to force the plastic inwardly thereby improving the seal. Then oil will not penetrate the assembly when it is immersed in the oil and subjected to heat and pressure as described above. The number of inches of edge rolling of the periphery was equal to or less than that customarily done with curved windshields which did not have the compound curvature but were preliminary pressed by passing through the pair of nipper rolls.

These laminated glass assemblies after the edge rolling were then subjected to the customary autoclave oil treatment after removal of the channel-shaped member 11 from around the periphery of the glass assembly. A high yield of satisfactorily pressed laminated glass assemblies was obtained. The yield was higher than obtainable in the plant production of wrap-around windshields that did not have the compound curvature. With the apparatus having a pair of yieldable nipper rolls, such compound windshields could not be properly prepressed for the subsequent autoclave operation to complete the pressing.

In prepressing the glass assembly, by using certain types of continuous channel-shaped members that serve as a fluid-impervious material for providing the conduit, it has been found possible to provide an adequate sealing engagement so that evacuation during the heating step in unnecessary. This sealing engagement can be accomplished either by proper design of the channel-shaped member or the use of a sealing compound or material placed on the inner surfaces of the flanges that will engage the marginal outer surfaces of the laminated glass assembly. For example, with certain channel-shaped continuous tubing the valve to a vacuum source was closed before the heating step and there was substantially no loss of vacuum during the heating operation which was at 250° F. for one-half hours. With other designs of channel-shaped continuous member the vacuum in the conduit dropped from about 750 millimeters to a vacuum of 150 millimeters at the end of the one-half hour at 250° F.

In a second embodiment of the method of this invention, the continuous channel member is placed around the curved laminated assembly during the prepressing and the conduit thus provided is evacuated as described above in the first embodiment. Then the valve is closed to shut off the vacuum from channel 19. Tube 17 is disconnected from the vacuum source. A number of laminated assemblies each containing the channel-shaped member 11 around the periphery and prepared as thus described are placed on racks of a cart and the latter is placed in an oven maintained at an elevated temperature and is at substantially atmospheric pressure. For the first and this embodiment, the temperature in the oven ranges from 150 to 350° F., preferbaly 225 to 300° F. The time in the oven ranges from 5 minutes to several hours. The time required varies inversely with the temperature. The assemblies are removed from the oven. The channel-shaped members are removed from the periphery of the assemblies. After edge rolling the assemblies are placed in an autoclave in direct contact with the fluid, e.g., oil, and then subjected to the usual treatment at elevated temperature and pressure, indicated below, for the final pressing.

Tube 17 without valve V can be used to evacuate channel 19 and then disconnected from the vacuum source and sealed. For example, a relatively small diameter copper tubing is used. It is pinched off when sufficient vacuum in channel 19 is obtained. A commercially available tool is used to pinch off the copper tubing and at the same time cut it so as to provide a sealed end.

Instead of using the preformed continuous channel-shaped member for placing around the periphery and marginal portion of the curved laminated assemblies, channel-shaped member 11 can be formed around the assembly. For example, a porous elastic tape can be mounted around the periphery of the assembly 12 in contact with the interlayer 15 and then a plastic putty material can be hand shaped to cover the entire periphery including the elastic tape with the plastic putty covering at least a marginal portion of the surfaces of assembly 12. A tube through the plastic putty into contact with the elastic tape cooperates with the tape to provide air passages to the periphery of the assembly. A plastic putty suitable for this purpose is a polyalkylene polysulfide material, "Thiokol," which can be improved in its properties for this purpose by the addition of carbon black.

The following are additional examples of the embodiments and modifications that have been described above and, of course, illustrate the use of different apparatus for carrying out the method of the present invention.

*Example II*

A length of plastic tubing made of polyvinyl chloride (Koroseal) was split longitudinally with a razor blade and the ends of the tube were welded by heat to provide continuous channel-shaped member 11. A piece of unsplit tubing 17 was heat welded onto the side of the continuous split tubing with its conduit 20 in alignment with a hole 18 in the side of continuous split tubing 11. The split tubing 11 was placed around the periphery of a curved laminated assembly 12 of two sheets 13 and 14 of curved glass and a thermoplastic interlayer 15 (vinyl) therebetween to provide conduit 19. The free end of the tubing 17 was connected to a vacuum source. Air was evacuated from conduit 19 and evacuation was continued while assembly 12 and continuous channel-shaped member 11 therearound was maintained in an oven at 250° F. for forty minutes. The assembly was removed from the oven. The vinyl chloride continuous tubing 11 was removed from laminated glass assembly 12. Visual examination showed the marginal area of a number of laminated glass assemblies made by this method was satisfactorily prepressed. The assemblies were then subjected to the standard autoclave treatment by immersing a number of the assemblies directly in oil at 150° F. A pressure of 200 pounds per square inch was applied to the oil and while this pressure was continued, the oil was heated to about 250° F. and maintained at that pressure and temperature for about forty-five minutes. The temperature of the oil was lowered to 150° F. and then the pressure was removed. The assemblies were removed from the oil. Visual examination and the usual tests for quality showed the laminated glass assemblies to be satisfactory.

Other curved windshields were laminated as described in the immediately preceding paragraph using oven temperatures as high as 300° F. with a decrease in time of heating time to twenty minutes. An equally satisfactory product was obtained by this method of prepressing in combination with the usual autoclave operation utilizing the direct immersion of the prepressed laminated assemblies.

*Example III*

One hundred and twenty-five curved laminated glass assemblies having conical end sections were treated as follows for the preparation of windshields for the 1955 Ford Thunderbird:

Around each curved laminated assembly was placed a continuous rubber channel-shaped member 11 having a vacuum outlet tubing 17 connected thereto. Using a vacuum source of greater than 25 inches of mercury, conduit 19 of member 11 was evacuated to draw out the air from between the interlayer and the glass sheets. Evacuation was continued while the entire assembly with the continuous channel-shaped member therearound was heated in an oven maintained at 225° F. Some of the curved laminated glass assemblies were heated for only twenty minutes. Others were heated for periods as long as one hour. The assemblies were then removed from the oven and the channel-shaped member removed from the periphery of the laminated assembly. The windshields appeared to be satisfactorily sealed in the marginal area and on the average required only about 10 inches of edge rolling. These windshields were then placed directly in oil at 150° F. Several were processed at one time in the autoclave. A pressure of 200 pounds per square inch was applied to the oil. While the pressure was continued, the oil was heated to 275° F. and then held at that temperature for thirty minutes. Then the temperature of the oil was lowered to 150° F. when the pressure was removed and the assemblies removed from the oil. The yield of satisfactory Ford Thunderbird wrap-around windshields from these 125 windshields was 96 per cent. A few of the satisfactory windshields were subjected to the customary tests for adhesion and heat stability. The results of these standard tests showed the windshields to be entirely satisfactory. This confirmed the conclusion drawn from the visual observation of the windshields after the autoclave treatment.

The standard or usual autoclave treatment has been mentioned a number of times in the foregoing description. It utilizes temperatures of about 190 to 325° F., preferably about 225 to 300° F., and simultaneously the application of pressure, such as between about 100 and 250 pounds per square inch, and preferably about 175 to 225 pounds per square inch. The time of treatment depends upon these conditions. Specific time values have been given in the pertinent examples.

In the foregoing description, including the various embodiments and examples, various modifications have been presented. Other modifications will be apparent to one skilled in the art. The foregoing description is merely for purposes of illustration and not by way of limitation. The invention is limited only by the claims which follow.

I claim:

1. The method of treating an assembly comprising two matched curved glass sheets and a thermoplastic interlayer to bond the interlayer to the glass sheets substantially throughout the entire area which comprises enclosing the periphery and the margin only of the assembly with a flexible channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member to remove air from between the interlayer and the glass sheets, heating the assembly and the material enclosing it to an elevated temperature to bond the interlayer to each glass sheet in at least its marginal area while continuing the evacuation to maintain the vacuum in the conduit, removing the member enclosing the assembly, and subjecting the assembly including the periphery of the interfaces between the interlayer and the glass sheets directly to an elevated temperature and an elevated fluid pressure substantially above atmospheric pressure and sufficient to bond the interlayer to the glass sheets substantially throughout the entire area of the assembly.

2. The method of treating an assembly comprising two matched curved glass sheets and a thermoplastic interlayer to bond the interlayer to the glass sheets substantially throughout the entire area, which comprises enclosing the periphery and the margin only of the assembly with a flexible, channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member to remove air from between the interlayer and the glass sheets, heating the assembly and the material enclosing it to bond the interlayer to each glass sheet in at least its marginal area by placing the assembly and the material enclosing it in a chamber at a temperature of about 150 to 350° F. with the chamber at substantially atmospheric pressure while continuing the evacuation to maintain the vacuum in the conduit, removing the member enclosing the assembly, and subjecting the assembly including the periphery of the interfaces between the interlayer and the glass sheets directly to an elevated temperature and an elevated fluid pressure substantially above atmospheric pressure and sufficient to bond the interlayer to the glass sheets substantially throughout the entire area of the assembly.

3. The method of claim 2 wherein the chamber is maintained at 225 to 300° F.

4. The method of treating an assembly comprising two matched curved glass sheets and a thermoplastic interlayer to bond the interlayer to the glass sheets substantially throughout the entire area, which comprises enclosing the periphery and the margin only of the assembly with a flexible, channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member to remove air from between the interlayer and the glass sheets, placing the assembly and the material enclosing it in a chamber at a temperature of about 150 to 350° F. with the chamber at substantially atmospheric pressure to bond the interlayer to each glass sheet in at least its marginal area while maintaining the vacuum in the conduit, removing the member from the assembly, immersing the assembly in a fluid in direct contact with the assembly including the periphery of the interfaces between the interlayer and the glass sheets, and subjecting the assembly while immersed in the fluid to an elevated temperature and an elevated fluid pressure substantially above atmospheric pressure and sufficient to bond the interlayer to the glass sheet substantially throughout the entire area of the assembly.

5. The method of treating an assembly comprising two matched curved glass sheets and a thermoplastic interlayer to bond the interlayer to the glass sheets substantially throughout the entire area, which comprises enclosing the entire periphery and the margin only of the assembly with an endless flexible, channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member to remove air from between the interlayer and the glass sheets, placing the assembly and the material enclosing it in a chamber at a temperature of about 150 to 350° F. with the chamber at substantially atmospheric pressure to bond the interlayer to each glass sheet in at least its marginal area while continuing the evacuation to maintain the vacuum in the conduit, removing the member from the assembly, immersing the assembly in a fluid in direct contact with the assembly including the periphery of the interfaces between the interlayer and the glass sheets, and subjecting the assembly while immersed in the fluid to an elevated temperature and an elevated fluid pressure substantially above atmospheric pressure and sufficient to bond the interlayer to the glass sheet substantially throughout the entire area of the assembly.

6. The method of treating an assembly comprising two matched curved glass sheets and a thermoplastic interlayer to bond the interlayer to the glass sheets substantially throughout the entire area, which comprises enclosing the entire periphery and the margin only of the assembly with an endless, flexible, channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member by means of a vacuum of at least about 10 inches of mercury to remove air from between the interlayer and the glass sheets, heating the assembly and the material enclosing it in a chamber at a temperature of about 150 to 350° F. to bond the interlayer to each glass sheet in at least its marginal area while continuing the evacuation to maintain the vacuum in the conduit from the assembly, removing the member from the assembly, immersing the assembly in oil in direct contact with the assembly including the periphery of the interfaces between the interlayer and the glass sheets, and subjecting the assembly while immersed in the oil to a temperature of about 190 to 325° F. and an oil pressure between about 100 and 250 pounds per square inch to bond the interlayer to the glass sheets substantially throughout the entire area of the assembly.

7. The method of treating an assembly comprising two matched curved glass sheets and a thermoplastic interlayer to bond the interlayer to the glass sheets substantially throughout the entire area, which comprises enclosing the entire periphery and the margin only of the assembly only with an endless, flexible, channel-shaped member made of a fluid-impervious material to place the member in engagement with a marginal portion of the outer surfaces of the assembly and in spaced relation to at least part of the periphery of the assembly to provide a conduit adjacent the periphery of the interfaces between the interlayer and the glass sheets, evacuating air from the conduit through the member by means of a vacuum of at least about 25 inches of mercury to remove air from between the interlayer and the glass sheets, heating the assembly and the material enclosing it in a chamber at a temperature of about 150 to 350° F. to bond the interlayer to each glass sheet in at least its marginal area while continuing the evacuation to maintain the vacuum in the conduit, removing the member from the assembly, immersing the assembly in oil in direct contact with the assembly including the periphery of the interfaces between the interlayer and the glass sheets, and subjecting the assembly while immersed in the oil to a temperature of about 225 to 300° F. and an oil pressure between about 175 and 225 pounds per square inch to bond the interlayer to the glass sheets substantially throughout the entire area of the assembly.

8. The method of treating an assembly comprising two glass sheets and a thermoplastic interlayer to bond the interlayer to the glass sheets substantially throughout the entire area which comprises substantially enclosing the periphery and the margin only of the assembly with a member made of a fluid-impervious material to place the member in spaced relation to at least part of the periphery of the assembly to provide a conduit adjacent the periphery of the interfaces between the interlayer and the glass sheets, evacuating the conduit through the member to remove gas trapped between the interlayer and the glass sheets, heating the assembly and the member enclosing it to an elevated temperature to bond the interlayer to each glass sheet in at least its marginal area while maintaining the vacuum in the conduit, removing the member enclosing the periphery of the assembly, and subjecting the assembly including the periphery of the interfaces between the interlayer and the glass sheets directly at an elevated temperature to an elevated fluid pressure substantially above atmospheric pressure and sufficient to bond the interlayer to the glass sheets substantially throughout the entire area of the assembly.

9. The method of treating an assembly comprising two glass sheets and a thermoplastic interlayer to bond the interlayer to the glass sheets substantially throughout the entire area which comprises substantially enclosing the periphery and the margin only of the assembly with a member made of a fluid-impervious material to place the member in spaced relation to at least part of the periphery of the assembly to provide a conduit adjacent the periphery of the interfaces between the interlayer and the glass sheets, evacuating the conduit through the member to remove gas trapped between the interlayer and the glass sheets, heating the assembly and the member enclosing it to an elevated temperature to bond the interlayer to each glass sheet in at least its marginal area while maintaining the vacuum in the conduit, removing the member enclosing the periphery of the assembly, edge rolling at least a portion of the edge of the assembly, and subjecting the assembly including the periphery of the interfaces between the interlayer and the glass sheets directly at an elevated temperature to an elevated fluid pressure substantially above atmospheric pressure and sufficient to bond the interlayer to the glass sheets substantially throughout the entire area of the assembly.

10. The method of treating an assembly comprising two glass sheets and a thermoplastic interlayer to bond the interlayer to the glass sheets substantially throughout the entire area which comprises substantially enclosing the periphery and the margin only of the assembly with a member made of a fluid-impervious material to place the member in spaced relation to at least part of the periphery of the assembly to provide a conduit adjacent the periphery of the interfaces between the interlayer and the glass sheets, evacuating the conduit through the member to remove gas trapped between the interlayer and the glass sheets, heating the assembly and the member enclosing it to an elevated temperature to bond the interlayer to each glass sheet in at least its marginal area while maintaining the vacuum in the conduit, removing the member enclosing the periphery of the assembly, edge rolling at least a portion of the edge of the assembly, and subjecting the assembly including the periphery of the interfaces between the interlayer and the glass sheets directly to an elevated temperature and an elevated fluid pressure substantially above atmospheric pressure and sufficient to bond the interlayer to the glass sheets substantially throughout the entire area of the assembly.

11. The method of treating an assembly comprising two glass sheets and a thermoplastic interlayer to bond the interlayer to the glass sheets substantially throughout the entire area which comprises providing a vacuum substantially only at the periphery of the assembly to remove gas trapped between the interlayer and the glass sheets, heating the assembly to an elevated temperature while maintaining the vacuum at the periphery of the assembly to bond the interlayer to each glass sheet in at least its marginal area, and subjecting at an elevated temperature the assembly including the periphery of the interfaces between the interlayer and the glass sheets directly to an elevated fluid pressure substantially above atmospheric pressure and sufficient to bond the interlayer to the glass sheets substantially throughout the entire area of the assembly.

12. The method of treating an assembly comprising two glass sheets and a thermoplastic interlayer to bond the interlayer to the glass sheets substantially throughout the entire area which comprises substantially enclosing the periphery and the margin only of the assembly with a member made of a fluid-impervious material to provide a conduit adjacent part of the periphery of the interfaces between the interlayer and the glass sheets, evacuating the conduit through the member to provide a vacuum at the periphery of the interfaces and to remove gas trapped between the interlayer and the glass sheets, heating the assembly to an elevated temperature while maintaining the vacuum at the periphery of the interfaces to bond the interlayer to each glass sheet in at least its marginal area, releasing the vacuum at the periphery of the interfaces of the assembly, and subjecting at an elevated temperature the assembly including the periphery of the interfaces between the interlayer and the glass sheets directly to an elevated fluid pressure substantially above atmospheric pressure and sufficient to bond the interlayer to the glass sheets substantially throughout the entire area of the assembly.

13. The method of treating an assembly comprising two glass sheets and a thermoplastic interlayer to bond the interlayer to the glass sheets substantially throughout the entire area which comprises placing an endless, flexible channel member made of fluid-impervious material around the entire periphery of the assembly with the inner surfaces of the flanges of the member in engagement with a marginal area of the outer surfaces of the assembly and at least part of the inner surface of the web portion of the channel member being spaced from the periphery of the assembly thereby encasing the periphery and the margin only of the assembly to provide a conduit adjacent the periphery of the interfaces between the interlayer and the glass sheets, evacuating the conduit through an aperture in said channel member while maintaining substantially atmospheric pressure on the outer surfaces of the assembly to provide a vacuum at the periphery of the interfaces thereby to remove gas trapped between the interlayer and the glass sheets, heating the assembly to an elevated temperature while maintaining the vacuum at the periphery of the interfaces and the substantially atmospheric pressure on the outer surfaces of the assembly to bond the interlayer to each glass sheet in at least its marginal area, and subjecting at an elevated temperature the assembly including the periphery of the interfaces between the interlayer and the glass sheets directly to an elevated fluid pressure substantially above atmospheric pressure and sufficient to bond the interlayer to the glass sheets substantially throughout the entire area of the assembly.

14. The method of treating an assembly comprising two glass sheets and a thermoplastic interlayer to bond the interlayer to the glass sheets substantially throughout the entire area which comprises placing an endless, flexible channel member made of fluid-impervious material around the entire periphery of the assembly with the inner surfaces of the flanges of the member in engagement with a marginal area of the outer surfaces of the assembly and at least part of the inner surface of the web portion of the channel member being spaced from the periphery of the assembly thereby encasing the periphery and the margin only of the assembly to provide a conduit adjacent the periphery of the interfaces between the interlayer and the glass sheets, evacuating the conduit through an aperture in said channel member while maintaining substantially atmospheric pressure on the outer surfaces of the assembly to provide a vacuum at the periphery of the interfaces thereby to remove gas trapped between the interlayer and the glass sheets, heating the assembly to an elevated temperature while maintaining the vacuum at the periphery of the interfaces and the substantially atmospheric pressure on the outer surfaces of the assembly to bond the interlayer to each glass sheet in at least its marginal area, removing the channel member from around the periphery of the assembly, and subjecting at an elevated temperature the assembly including the periphery of the interfaces between the interlayer and the glass sheets directly to an elevated fluid pressure substantially above atmospheric pressure and sufficient to bond the interlayer to the glass sheets substantially throughout the entire area of the assembly.

(References on following page)

References Cited in the file of this patent

UNITED STATES PATENTS

| | | |
|---|---|---|
| 504,890 | Ohmart | Sept. 12, 1893 |
| 1,539,239 | Bull | May 26, 1925 |
| 1,732,022 | Lytle | Oct. 15, 1929 |
| 1,734,379 | Hitchcock | Nov. 5, 1929 |
| 1,870,284 | Drake | Aug. 9, 1932 |
| 1,872,693 | Drake | Aug. 23, 1932 |
| 1,909,444 | Worall | May 16, 1933 |
| 1,965,114 | Drake | July 3, 1934 |
| 2,054,864 | Owen | Sept. 22, 1936 |
| 2,374,040 | Ryan | Apr. 17, 1945 |
| 2,673,822 | Dennison et al. | Mar. 30, 1954 |
| 2,700,632 | Ackerlind | Jan. 25, 1955 |
| 2,714,567 | Cravener | Aug. 2, 1955 |

FOREIGN PATENTS

| | | |
|---|---|---|
| 327,949 | Great Britain | Apr. 14, 1930 |